US012578604B2

(12) United States Patent
Matsubara

(10) Patent No.: US 12,578,604 B2
(45) Date of Patent: Mar. 17, 2026

(54) LIGHT CONTROL SHEET

(71) Applicant: TOPPAN HOLDINGS INC., Tokyo (JP)

(72) Inventor: Yoshitaka Matsubara, Taito-ku (JP)

(73) Assignee: TOPPAN HOLDINGS INC., Tokyo (JP)

( * ) Notice: Subject to any disclaimer, the term of this patent is extended or adjusted under 35 U.S.C. 154(b) by 71 days.

(21) Appl. No.: 18/767,161

(22) Filed: Jul. 9, 2024

(65) Prior Publication Data

US 2024/0361642 A1 Oct. 31, 2024

Related U.S. Application Data

(63) Continuation of application No. PCT/JP2022/046608, filed on Dec. 19, 2022.

(30) Foreign Application Priority Data

Jan. 11, 2022 (JP) ................................. 2022-002048

(51) Int. Cl.
*G02F 1/1339* (2006.01)
*G02F 1/1335* (2006.01)
(Continued)

(52) U.S. Cl.
CPC .... *G02F 1/13398* (2021.01); *G02F 1/133514* (2013.01); *G02F 1/13439* (2013.01); *G02F 1/137* (2013.01); *G02F 2202/04* (2013.01)

(58) Field of Classification Search
CPC .. G02F 1/1334; G02F 1/133514; G02F 1/137; G02F 1/13725; G02F 2202/04;
(Continued)

(56) References Cited

U.S. PATENT DOCUMENTS

2002/0171788 A1 11/2002 Lin et al.
2014/0226096 A1* 8/2014 Taheri ................. G02F 1/13306
349/33
(Continued)

FOREIGN PATENT DOCUMENTS

JP H03-072317 A 3/1991
JP 2018-146654 A 9/2018
(Continued)

OTHER PUBLICATIONS

International Search Report issued Mar. 7, 2023 in PCT/JP2022/046608, filed Dec. 19, 2022, 5 pages.
(Continued)

*Primary Examiner* — Jonathan Y Jung
(74) *Attorney, Agent, or Firm* — Oblon, McClelland, Maier & Neustadt, L.L.P.

(57) ABSTRACT

A light control sheet includes a light control layer including an organic polymer layer including voids and a liquid crystal composition filling the voids, transparent electrode layers, and transparent support layers. The liquid crystal composition includes a liquid crystal compound and a dichroic dye, the light control layer is sandwiched between the transparent electrode layers, the light control layer and the transparent electrode layers are sandwiched between the transparent support layers, the light control sheet switches from a transparent state to an opaque state exhibiting a first color due to change in alignment of the liquid crystal compound and the dichroic dye in response to change in potential difference between the transparent electrode layers, and a parallel light transmittance PTa in the opaque state and a parallel light transmittance PTb in the transparent state satisfy a relationship PTb/PTa>80.

20 Claims, 3 Drawing Sheets

(51) Int. Cl.
  *G02F 1/1343*     (2006.01)
  *G02F 1/137*      (2006.01)
(58) Field of Classification Search
  CPC ......... G02F 2202/022; G02F 2202/023; G02F
                1/13342; G02F 1/13775; B01J 13/14;
                                              B01J 13/16
  See application file for complete search history.

(56)                 References Cited

U.S. PATENT DOCUMENTS

| | | | |
|---|---|---|---|
| 2021/0181585 A1 | 6/2021 | Junge et al. | |
| 2022/0121054 A1* | 4/2022 | Yasuhara | ............... G02F 1/1334 |
| 2022/0299804 A1* | 9/2022 | Kaneko | ............... G02F 1/13439 |
| 2022/0413326 A1* | 12/2022 | Li | ......................... G01J 1/4257 |

FOREIGN PATENT DOCUMENTS

| | | | | |
|---|---|---|---|---|
| JP | 2019-101384 A | 6/2019 | | |
| JP | 2020-016710 A | 1/2020 | | |
| JP | 2021071701 A * | 5/2021 | ......... G02F 1/13345 | |
| JP | 2021-105709 A | 7/2021 | | |
| WO | WO 2021/233797 A1 | 11/2021 | | |

OTHER PUBLICATIONS

Extended European Search Report issued Apr. 3, 2025 in European
Patent Application No. 22920566.1, 9 pgs.

* cited by examiner

FIG.3

| CONDITIONS | | EX. 1 | EX. 2 | EX. 3 | EX. 4 | EX. 5 | EX. 6 | EX. 7 |
|---|---|---|---|---|---|---|---|---|
| DICHROIC DYE | | PRESENT | PRESENT | PRESENT | PRESENT | PRESENT | PRESENT | PRESENT |
| SPACER COLOR | | BLACK | WHITE | BLACK | WHITE | BLACK | WHITE | WHITE |
| LIGHT CONTROL SHEET — OPAQUE STATE | PARALLEL LIGHT TRANSMITTANCE PTa (%) | 0.23 | 0.57 | 0.11 | 0.26 | 0.02 | 0.05 | 0.79 |
| | TOTAL LIGHT TRANSMITTANCE (%) | 15.4 | 17.0 | 6.55 | 8.02 | 1.24 | 1.52 | 58.4 |
| | CHROMATICITY a* | 1.0 | 0.5 | 0.4 | 0.2 | 0.1 | -1.0 | 0.9 |
| | CHROMATICITY b* | -6.0 | -7.0 | 3.0 | -4.5 | 1.0 | -2.0 | 26.0 |
| TRANSPARENT STATE | PARALLEL LIGHT TRANSMITTANCE PTb (%) | 56.3 | 57.82 | 24.01 | 24.68 | 4.51 | 4.62 | 81.74 |
| COLORED LAYER | TOTAL LIGHT TRANSMITTANCE (%) | (ABSENT) | (ABSENT) | 46 | 46 | 7 | 7 | ABSENT |
| PTb/PTa | | 244.78 | 101.44 | 218.27 | 94.92 | 225.5 | 92.4 | 103.47 |
| EXTERNAL APPEARANCE | | EXCELLENT | GOOD | EXCELLENT | GOOD | EXCELLENT | GOOD | FAIR |

FIG.4

| CONDITIONS | | | COMP. EX. 1 | COMP. EX. 2 | COMP. EX. 3 | COMP. EX. 4 |
|---|---|---|---|---|---|---|
| DICHROIC DYE | | | ABSENT | ABSENT | ABSENT | ABSENT |
| SPACER COLOR | | | BLACK | WHITE | WHITE | WHITE |
| LIGHT CONTROL SHEET | OPAQUE STATE | PARALLEL LIGHT TRANSMITTANCE PTa (%) | 1.14 | 1.57 | 0.72 | 0.15 |
| | | TOTAL LIGHT TRANSMITTANCE (%) | 83.5 | 87.0 | 38.9 | 7.2 |
| | | CHROMATICITY a* | -0.5 | -0.7 | 1.0 | 2.0 |
| | | CHROMATICITY b* | 4.0 | 5.5 | 2.0 | 0.5 |
| | TRANSPARENT STATE | PARALLEL LIGHT TRANSMITTANCE PTb (%) | 85.15 | 83.18 | 35.53 | 6.62 |
| | COLORED LAYER | TOTAL LIGHT TRANSMITTANCE (%) | (ABSENT) | (ABSENT) | 46 | 7 |
| PTb/PTa | | | 74.69 | 52.98 | 49.35 | 44.13 |
| EXTERNAL APPEARANCE | | | POOR | POOR | POOR | POOR |

LIGHT CONTROL SHEET

CROSS-REFERENCE TO RELATED APPLICATIONS

The present application is a continuation of and claims the benefit of priority to International Application No. PCT/JP2022/046608, filed Dec. 19, 2022, which is based upon and claims the benefit of priority to Japanese Application No. 2022-002048, filed Jan. 11, 2022. The entire contents of these applications are incorporated herein by reference.

BACKGROUND OF THE INVENTION

Field of the Invention

The present invention relates to light control sheets.

Description of Background Art

In a light control sheet, JP 2020-016710 A describes adding a dichroic dye to a liquid crystal composition. The entire contents of this publication are incorporated herein by reference.

SUMMARY OF THE INVENTION

According to one aspect of the present invention, a light control sheet includes a light control layer including an organic polymer layer having voids and a liquid crystal composition filling the voids, transparent electrode layers formed such that the light control layer is sandwiched between the transparent electrode layers, and transparent support layers formed such that the light control layer and the transparent electrode layers are sandwiched between the transparent support layers. The light control layer is formed such that the liquid crystal composition includes a liquid crystal compound and a dichroic dye, the transparent electrode layers changes potential difference between the transparent electrode layers such that the light control layer switches from a transparent state to an opaque state exhibiting a first color due to change in alignment of the liquid crystal compound and the dichroic dye, and the light control layer includes the liquid crystal compound and the dichroic dye such that a parallel light transmittance PTa in the opaque state and a parallel light transmittance PTb in the transparent state satisfy a relationship PTb/PTa>80.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a table showing evaluation results according to examples of the light control sheet; and FIG. 4 is a table showing evaluation results according to comparative examples of the light control sheet.

DETAILED DESCRIPTION OF THE EMBODIMENTS

Figure 1:
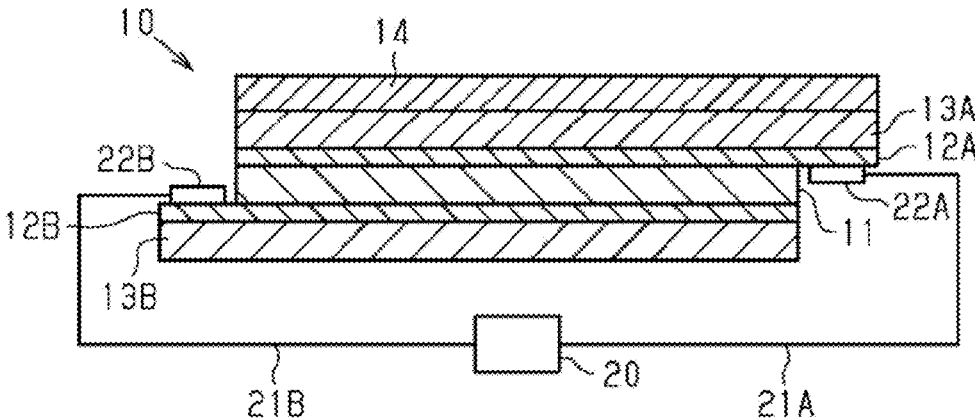
FIG. 1 is a cross-sectional view illustrating a light control sheet.

Embodiments will now be described with reference to the accompanying drawings, wherein like reference numerals designate corresponding or identical elements throughout the various drawings.

Light Control Sheet

A light control sheet is affixed to a transparent base material as an object to be attached. The transparent base material is a glass substrate or a resin substrate. Examples of the transparent base material include window glass installed in mobile objects such as vehicles and aircraft, window glass installed in buildings, and partitions disposed in vehicles or indoors. The surface to which the light control sheet is affixed is flat or curved. The light control sheet may be sandwiched between two transparent base materials. The transparent base material may be colorless and transparent or may be colored and transparent.

The drive type of the light control sheet may be normal or reverse. A normal type light control sheet transitions its state from opaque to transparent with voltage application thereto, and returns to opaque from transparent with release of voltage application. A reverse type light control sheet transitions its state from transparent to opaque with voltage application thereto, and returns to transparent from opaque with release of voltage application. The drive type of the light control sheet of the present embodiment is a normal type, as an example.

As shown in FIG. 1, a light control sheet 10 includes a light control layer 11, a first transparent electrode layer 12A, a second transparent electrode layer 12B, a first transparent support layer 13A, and a second transparent support layer 13B. The light control layer 11 is sandwiched between the first and second transparent electrode layers 12A and 12B. The first transparent support layer 13A supports the surface of the first transparent electrode layer 12A facing away from the light control layer 11. The second transparent support layer 13B supports the surface of the second transparent electrode layer 12B facing away from the light control layer 11.

Examples of the structure of the light control layer 11 include polymer dispersed liquid crystal (PDLC), polymer network liquid crystal (PNLC), and nematic curvilinear aligned phase (NCAP). A light control layer 11 containing the polymer dispersed liquid crystal includes numerous independent voids or voids each formed of connected parts of the independent voids, with a liquid crystal composition held in the voids. The polymer network liquid crystal includes a three-dimensional mesh polymer network as a resin layer, and holds a liquid crystal compound as alignment particles in the voids of the polymer network. The nematic curvilinear aligned phase holds a capsule-shaped liquid crystal composition in a resin layer. The light control layer 11 of the present embodiment contains a polymer dispersed liquid crystal. The liquid crystal composition contains a liquid crystal compound and a dichroic dye.

The first and second transparent electrodes 12A and 12B have light translucency allowing visible light to pass therethrough, and electrical conductivity. Examples of the material forming the first and second transparent electrode layers 12A and 12B include at least one of indium tin oxide, fluorine-doped tin oxide, tin oxide, zinc oxide, carbon nanotubes, and poly(3,4-ethylenedioxythiophene).

The first and second transparent support layers 13A and 13B have light translucency allowing visible light to pass therethrough, and electrical insulation properties. The material of the first and second transparent support layers 13A and 13B may be an organic polymer compound or an inorganic polymer compound. Examples of the organic polymer compound include at least one selected from polyesters, polyacrylates, polycarbonates, and polyolefins. Examples of the inorganic polymer compound include at least one of silicon dioxide, silicon oxynitride, and silicon nitride.

The first transparent electrode layer 12A is connected to a control unit 20 via a first wiring 21A and a first electrode 22A. The second transparent electrode layer 12B is connected to the control unit 20 via a second wiring 21B and a second electrode 22B. The first and second wirings 21A and 21B each include, for example, a metal wire and an insulating layer covering the metal wire. The wire may be made of copper, as an example. The insulating layer may be made of a resin, as an example. The first and second electrodes 22A and 22B may each be, for example, a flexible printed circuit (FPC) board.

For example, the first electrode 22A may be attached to the first transparent electrode layer 12A via a conductive adhesive layer, not shown. The second electrode 22B may be attached to the second transparent electrode layer 12B via a conductive adhesive layer. Examples of the material forming the conductive adhesive layer include an anisotropic conductive film (ACF), anisotropic conductive paste (ACP), isotropic conductive film (ICF), and isotropic conductive paste (ICP).

The modes of connecting between the first transparent electrode layer 12A and the control unit 20, and between the second transparent electrode layer 12B and the control unit 20 are not limited to the above examples. For example, the first wiring 21A may be soldered directly to the first transparent electrode layer 12A without using the first electrode 22A. Similarly, the second wiring 21B may be soldered directly to the second transparent electrode layer 12B without using the second electrode 22B.

The control unit 20 applies a voltage between the first and second transparent electrode layers 12A and 12B. The light control layer 11 changes the alignment of the liquid crystal compound in response to voltage changes caused between the first and second transparent electrode layers 12A and 12B. The alignment change in the liquid crystal compound changes the degrees of scattering, absorption, and transmission of visible light entering the light control layer 11. When no voltage signal is applied to the first and second transparent electrode layers 12A and 12B, orientations of the long axes of the liquid crystal compound molecules are irregular. Accordingly, the degree of scattering of visible light incident on the light control layer 11 increases, whereby the light control layer 11 is brought into a colored opaque state. The color exhibited by the light control layer 11 in the opaque state relies on the color of the dichroic dye. The color exhibited by the light control layer 11 in the opaque state is, as an example, black or a color close to black.

However, when a voltage signal is applied to the first and second transparent electrode layers 12A and 12B, the liquid crystal compound is aligned. Thus, the direction of the long axes of the liquid crystal compound molecules becomes parallel to the electric field direction between the first and second transparent electrode layers 12A and 12B. Consequently, light is easily transmitted through the light control layer 11, and the light control layer 11 is brought into a colorless and transparent state.

The light control sheet 10 further includes a colored layer 14. The colored layer 14 is disposed on the surface of the first transparent support layer 13A facing away from the surface contacting the first transparent electrode layer 12A. The colored layer 14 may be fixed to the first transparent support layer 13A via an adhesive layer, not shown. The colored layer 14 has the same color as the color exhibited by the light control layer 11 in the opaque state, i.e., exhibits a black color or a color close to black in the present embodiment. The light control sheet 10 can exhibit a composite color in which the color exhibited by the light control layer 11 is overlapped with the color exhibited by the colored layer 14. Therefore, the color of the light control sheet 10 in the opaque state can be made clearer, compared to the case of achieving the color of the light control sheet 10 in the opaque state only with the color exhibited by the light control layer 11.

The total light transmittance of the colored layer 14 is preferred to be 3% or more and 50% or less. If the total light transmittance of the colored layer 14 is in the above range, the total light transmittance of the light control sheet 10 in the opaque state can be reduced, while preventing excessive reduction of the total light transmittance in the transparent state.

The lower limit of the total light transmittance of the colored layer 14 may, for example, be preferably 7%, 10%, 20%, 30%, or 40%. The upper limit of the total light transmittance of the colored layer 14 may, for example, be preferably 46%, 40%, 30%, 20%, or 10%.

Light Control Layer

Figure 2:
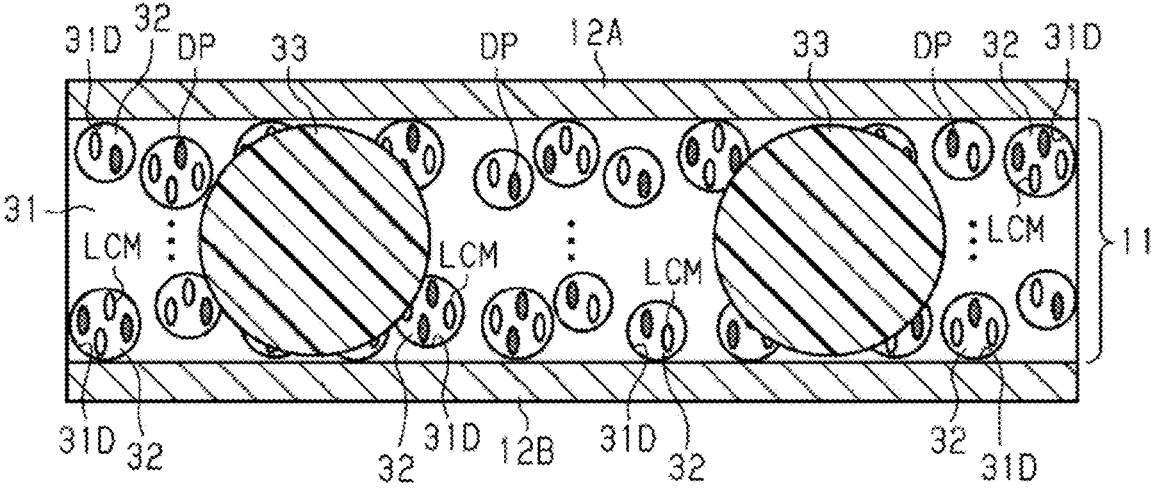
FIG. 2 is a schematic diagram illustrating a light control layer.

Referring to FIG. 2, the light control layer 11 will be described in detail. FIG. 2 shows part of a cross-sectional structure of the light control sheet 10, including the polymer dispersed light control layer 11, first transparent electrode layer 12A, and second transparent electrode layer 12B.

The light control layer 11 contains an organic polymer layer 31, a liquid crystal composition 32, and spacers 33. The organic polymer layer 31 is a cured product of a photopolymerizable compound. The photopolymerizable compound may be a UV curable compound or an electron beam curable compound. The photopolymerizable compound is compatible with the liquid crystal composition 32.

The organic polymer layer 31 defines voids 31D in the light control layer 11. If dimensional controllability of the voids 31D is required to be improved, the photopolymerizable compound is preferred to be a UV curable compound. An example of the UV curable compound may contain polymerizable unsaturated bonds at the ends of the molecule structure. Alternatively, the UV curable compound may contain polymerizable unsaturated bonds at positions other than the ends of the molecule structure. The photopolymerizable compound may be a single polymerizable compound or may be a combination of two or more polymerizable compounds. The UV curable compound is at least one selected from acrylate compounds, methacrylate compounds, styrene compounds, thiol compounds, and oligomers of these compounds. The acrylate compounds include diacrylate compounds, triacrylate compounds, and tetraacrylate compounds. Examples of the acrylate compounds include butyl ethyl acrylate, ethylhexyl acrylate, and cyclohexyl acrylate. The methacrylate compounds include dimethacrylate compounds, trimethacrylate compounds, and tetramethacrylate compounds. Examples of the methacrylate compounds include N,N-dimethylaminoethyl methacrylate, phenoxyethyl methacrylate, methoxyethyl methacrylate, and tetrahydrofurfuryl methacrylate. Examples of the thiol compounds include 1,3-propanedithiol, and 1,6-hexanedithiol. Examples of the styrene compounds include styrene and methylstyrene.

The liquid crystal composition 32 contains a liquid crystal compound LCM and a dichroic dye DP. The liquid crystal composition 32 may further contain a viscosity reducer, antifoaming agent, antioxidant, weathering agent, etc. Examples of the weathering agent include a UV absorber and light stabilizer.

The retention type of the liquid crystal composition 32 with the organic polymer layer 31 may be any one of a polymer dispersed type, polymer network type, and capsule type. The retention type of the liquid crystal composition 32 with the organic polymer layer 31 may be a combination of several types in the group.

The organic polymer layer 31 of the polymer dispersed type light control layer 11 defines therein numerous independent voids 31D. The organic polymer layer 31 of the polymer network type light control layer 11 includes three-dimensional mesh voids 31D. The liquid crystal composition 32 is located inside the intercommunicating mesh voids 31D. The organic polymer layer 31 of the capsule type light control layer 11 includes dispersed capsule-shaped voids 31D. The voids 31D have two or more sizes, and have spherical, ellipsoidal, or irregular shape.

The liquid crystal compound LCM may have positive dielectric anisotropy in which the dielectric constant in the long-axis direction of the liquid crystal compound LCM is higher than the dielectric constant thereof in the short-axis direction. Alternatively, the liquid crystal compound LCM may have negative dielectric anisotropy in which the dielectric constant in the long-axis direction of the liquid crystal compound LCM is lower than the dielectric constant thereof in the short-axis direction. The dielectric anisotropy of the liquid crystal compound LCM is appropriately selected based on the presence or absence of alignment layers in the light control sheet 10, and the drive type.

The liquid crystal compound LCM is at least one selected from Schiff base compounds, azo compounds, azoxy compounds, biphenyl compounds, terphenyl compounds, benzoic acid ester compounds, tolan compounds, pyrimidine compounds, pyridazine compounds, cyclohexanecarboxylic acid ester compounds, phenylcyclohexane compounds, biphenylcyclohexane compounds, dicyanobenzene compounds, naphthalene compounds, and dioxane compounds. The liquid crystal compound LCM may be a single liquid crystal compound or may be a combination of two or more liquid crystal compounds.

Molecules of the dichroic dye DP each have an elongated shape, and light absorbance in the visible region in the molecular long-axis direction is higher than the light absorbance in the molecular short-axis direction. The dichroic dye DP of the present embodiment is black or has a color close to black in the state in which the molecular long-axis direction intersects at a predetermined angle with the light incidence direction. Specifically, the dichroic dye DP is black or has a color close to black when the molecules are aligned such that the molecular long-axis direction is substantially orthogonal to the normal direction to the surfaces of the light control layer 11 contacting the first and second transparent electrode layers 12A and 12B. The dichroic dye DP is driven with a host-guest system using the liquid crystal compound LCM as a host to develop a color.

The dye used for the dichroic dye DP is a dye satisfying the chromaticity a* of the light control layer 11 in the opaque state being in the range of −15 or more and 15 or less and the chromaticity b* thereof being in the range of −15 or more and 15 or less in the CIE 1976 (L*a*b*) color system. The chromaticity a* and chromaticity b* in the CIE 1976 (L*a*b*) color system conform to the method of calculating color coordinates of the CIE 1976 (L*a*b*) color space defined in JIS-Z-8781-4 (ISO 11664-4).

The dichroic dye DP is at least one selected from polyiodine, azo compounds, anthraquinone compounds, naphtho-quinone compounds, azomethine compounds, tetrazine compounds, quinophthalone compounds, merocyanine compounds, perylene compounds, and dioxazine compounds. The dichroic dye DP may be a single dye or may be a combination of two or more dyes. If light resistance and dichroic ratio are required to be increased, the dichroic dye DP is preferred to be at least one selected from azo compounds and anthraquinone compounds, and more preferred to be azo compounds.

The lower limit of the content of the organic polymer layer 31 relative to the total mass of the organic polymer layer 31 and the liquid crystal composition 32 is preferred to be 20 mass %, and more preferred to be 30 mass %. The upper limit of the content of the organic polymer layer 31 relative to the total mass of the organic polymer layer 31 and the liquid crystal composition 32 is preferred to be 70 mass %, and more preferred to be 60 mass %.

The lower limit and upper limit of the content of the organic polymer layer 31 are determined according to the range of the content of the liquid crystal particles made of the liquid crystal composition 32, at which the liquid crystal particles can be phase-separated from the cured product of the photopolymerizable compound, in the curing process of the photopolymerizable compound. If the organic polymer layer 31 is required to have increased physical strength, the lower limit of the content of the organic polymer layer 31 is preferred to be higher. If the drive voltage for the liquid crystal compound LCM is required to be reduced, the upper limit of the content of the organic polymer layer 31 is preferred to be lower.

The spacers 33 are dispersed throughout the organic polymer layer 31. The spacers 33 determine the thickness of the light control layer 11 in the vicinities of the spacers 33, and make the thickness of the light control layer 11 uniform. The spacers 33 may be bead spacers or may be photo spacers formed by exposure and development of a photo resist. The spacers 33 have light translucency. The spacers 33 may be colorless and transparent or may be colored and transparent. The color exhibited by the colored transparent spacers 33 is preferred to be the same as the color exhibited by the dichroic dye DP.

The control unit 20 applies the drive voltage to the first and second transparent electrode layers 12A and 12B to cause a potential difference therebetween, according to which, the alignment of the liquid crystal compound LCM and the dichroic dye DP is controlled. The drive voltage changes the alignment state of the liquid crystal compound LCM and the dichroic dye DP. The control unit 20 changes the alignment state of the liquid crystal compound LCM and the dichroic dye DP to switch the light control sheet 10 from one of the transparent and opaque states to the other of these states. In the opaque state, the light control sheet 10 exhibits a black color or a color close to black, so that the total light transmittance becomes lower than in the transparent state. In other words, in the light control sheet 10 in the opaque state, haze, i.e., turbidity, becomes higher than in the transparent state.

While the drive voltage application is released, alignment of the molecular long-axes of the liquid crystal compound LCM and the dichroic dye DP is disordered. Thus, the light control sheet 10 is brought into the opaque state in which light scattering is caused in the light control layer 11 over the entire visible light region. Alignment of the molecular long-axes of the dichroic dye DP is also disordered. Of the molecules of the dichroic dye DP, at least those which have a predetermined angle, such as 90° or near 90°, between the normal direction to the surfaces of the light control layer 11 contacting the first and second transparent electrode layers 12A and 12B and the molecular long-axis direction of the dichroic dye DP, exhibit a black color. The above normal direction substantially matches the thickness direction of the light control layer 11.

With the application of the drive voltage, the liquid crystal compound LCM is subjected to the alignment regulating force of the electric field. In this case, the liquid crystal compound LCM and the dichroic dye DP are brought into an alignment state in which their molecular long-axis directions become parallel to the electric field direction. Thus, the total light transmittance of the light control sheet 10 becomes higher than in the opaque state. Also, since the dichroic dye DP is also brought into an alignment state in which its molecular long-axis direction becomes parallel to the electric field direction, the light control sheet 10 becomes colorless or near colorless.

When drive voltage application is released again, the liquid crystal compound LCM and the dichroic dye DP are released from the alignment regulating force of the electric field, and the alignment of their long axes is disordered. Thus, the light control sheet 10 is brought into the opaque state again in which light scattering is caused in the light control layer 11 over the entire visible light region.

Optical Characteristics of Light Control Sheet

Next, optical characteristics of the light control sheet 10 will be described.

The light control sheet 10 satisfies the following Condition 1.

Condition 1: The relationship between a parallel light transmittance PTa in the opaque state and a parallel light transmittance PTb in the transparent state satisfies PTb/PTa>80.

If the light control sheet 10 satisfies the above Condition 1, difference in shade of apparent hue between the transparent and opaque states increases. Accordingly, the contrast between the transparent and opaque states can be clearly seen in the light control sheet 10.

The value of PTb/PTa may, for example, be preferably 90 or more, 92.40 or more, 94.92 or more, 100 or more, 101.44 or more, 103.47 or more, 110 or more, 120 or more, 130 or more, 140 or more, 150 or more, 160 or more, 170 or more, 180 or more, 190 or more, 200 or more, 210 or more, 218.27 or more, 220 or more, 225.50 or more, 230 or more, 240 or more, 244.78 or more, or 250 or more.

For the above Condition 1, the value of PTb/PTa in the light control sheet 10 can be changed by changing the content of the dichroic dye DP in the light control layer 11. If the content of the dichroic dye DP in the light control layer 11 is increased, the parallel light transmittance PTa in the opaque state decreases. In this case, not only PTa but also the parallel light transmittance PTb in the transparent state decreases, but the value of PTb/PTa increases because the rate of decrease in PTa is greater than the rate of decrease in PTb. Contrarily, if the content of the dichroic dye DP in the light control layer 11 is decreased, the value of PTb/PTa decreases.

The content of the dichroic dye DP, as an example, may be 0.01 mass % or more and 10 mass % or less relative to the total mass of the organic polymer layer 31 and the liquid crystal composition 32. If the content of the dichroic dye DP is 0.01 mass % or more, the value of PTb/PTa can be sufficiently increased. If the content of the dichroic dye DP is 10 mass % or less, precipitation of particles, which are aggregates of the dichroic dye DP, can be prevented.

For the above Condition 1, the value of PTb/PTa in the light control sheet 10 can also be changed by changing the color of the spacers 33 contained in the light control layer 11. For example, if the spacers 33 are colored, the scattered light caused in the opaque state by the liquid crystal compound LCM can be absorbed by the spacers 33. Thus, compared to the case where the spacers 33 are white, or colorless and transparent, the parallel light transmittance PTa in the opaque state can be decreased. Accordingly, using the spacers 33 with a color other than white, the value of PTb/PTa can be made relatively large. From the perspective of favorably absorbing scattered light, the color of the spacers 33 is preferred to be black. If the spacers 33 exhibit the same color, in the opaque state, as the color exhibited by the dichroic dye DP, the hue of the spacers 33 becomes less noticeable in the appearance of the light control sheet 10.

For the above Condition 1, the value of PTb/PTa in the light control sheet 10 can be changed by changing the thickness of the light control layer 11. If the thickness of the light control layer 11 is increased, part of the liquid crystal compound LCM and dichroic dye DP dispersed in the thickness direction of the light control layer 11 may be less likely to be driven. In this case, even if the drive voltage is applied to bring the light control sheet 10 into the transparent state, part of the liquid crystal compound LCM and dichroic dye DP may not be aligned, so that the parallel light transmittance PTb in the transparent state may relatively decrease. However, if the thickness of the light control layer 11 is reduced, the entirety of the liquid crystal compound LCM and dichroic dye DP dispersed in the thickness direction of the light control layer 11 can be aligned with ease by applying the drive voltage. Accordingly, by reducing the thickness of the light control layer 11, PTb can be relatively increased.

The thickness of the light control layer 11, which almost matches the size of the spacers 33, can be controlled by changing the average particle size of the spacers 33. The average particle size of the spacers 33, as an example, may be 10 μm or more and 30 μm or less in median diameter D50. In this case, the thickness of the light control layer 11 may become approximately 10 μm or more and 30 μm or less.

For the above Condition 1, the value of PTb/PTa in the light control sheet 10 can also be changed by changing the degree of phase-separation of the liquid crystal particles constituted of the liquid crystal composition 32, from the photopolymerizable compound, in the process of curing the photopolymerizable compound.

For example, the lower the intensity of light for polymerizing the photopolymerizable compound, the less phase-separation of the liquid crystal particles from the photopolymerizable compound proceeds, thereby increasing the size of the voids 31D formed by curing the photopolymerizable compound. A light control layer 11 including a small number of large voids 31D is less likely to scatter light entering the light control layer 11, compared to a light control layer 11 including a large number of small voids 31D. Therefore, as the size of the voids 31D increases, i.e., as the intensity of light for polymerizing the photopolymerizable compound decreases, visible light is less likely to be scattered in the opaque state in which no drive voltage is applied. Consequently, as the size of the voids 31D contained in the organic polymer layer 31 increases, the parallel light transmittance PTa in the opaque state is likely to increase.

In contrast, by increasing the intensity of light for polymerizing the photopolymerizable compound in the process of curing the photopolymerizable compound, phase-separation of the liquid crystal particles from the photopolymerizable compound is promoted, by which the size of the voids 31D contained in the organic polymer layer 31 is reduced. Accordingly, PTa can be reduced when the transparent state is switched to the opaque state, or vice versa.

As described above, increase in condensation of the dichroic dye DP can darken the hue in the opaque state to thereby increase the contrast between the transparent and opaque states. Increase in thickness of the light control layer 11 can also darken the hue in the opaque state to thereby increase the contrast between the transparent and opaque states. However, the higher the concentration of the dichroic dye DP, the more difficult it is to drive the liquid crystal compound LCM, and the higher the possibility that aggregation of the dichroic dye DP may occur. Furthermore, the larger the thickness of the light control layer 11, the more difficult it is to drive the liquid crystal compound LCM, and the higher the possibility that light transmittance in the transparent state may be reduced. Therefore, there are limits to the measures of increasing the concentration of the dichroic dye DP or increasing the thickness of the light control layer 11 for the purpose of increasing contrast.

However, the light entering the light control layer 11 is scattered due to the refractive index difference between the organic polymer layer 31 and the liquid crystal composition 32. The light scattered inside the light control layer 11 is more likely to be absorbed by the dichroic dye DP as it travels along a longer optical path than parallel light does. On the other hand, light not scattered inside the light control layer 11 is less likely to be absorbed by the dichroic dye DP as it travels along a shorter optical path than scattered light does.

From this perspective, the parallel light transmittance PTa in the opaque state is preferred to be 0.6 or less. If the parallel light transmittance PTa in the opaque state is 0.6 or more, the dichroic dye DP can exert an absorption function in an environment where transmission of parallel light is suppressed. Specifically, the dichroic dye DP is imparted with an environment where parallel that is light less likely to be absorbed by the dichroic dye DP is suppressed, to achieve improvement in contrast. Therefore, the effect of improving contrast is enhanced.

The parallel light transmittance PTa in the opaque state may, for example, be preferably 0.57 or less, 0.5 or less, 0.4 or less, 0.3 or less, 0.26 or less, 0.23 or less, 0.2 or less, 0.11 or less, 0.1 or less, 0.05 or less, or 0.02 or less.

Furthermore, the light control sheet 10 is preferred to satisfy the following Conditions 2 and 3.

Condition 2: The total transmittance in the opaque state is 30% or less.

Condition 3: The chromaticity a* in the CIE 1976 (L*a*b*) color system according to JIS-Z-8781-4 is-15 or more and 15 or less, and the chromaticity b* therein is-15 or more and 15 or less.

If the light control sheet 10 satisfies the above Condition 2, visible light can be sufficiently blocked in the opaque state. The method of measuring total light transmittance conforms to JIS K 7361-1:1997 (ISO 1468-1).

The total light transmittance of the light control sheet 10 in the opaque state may, for example, be preferably 25% or less, 20% or less, 17.0% or less, 15.4% or less, 15% or less, 10% or less, 8.02% or less, 6.55% or less, 5% or less, 1.52% or less, or 1.24% or less.

If the light control sheet 10 satisfies the above Condition 3, the color of the light control sheet 10 in the opaque state can be black or a color close to black. Specifically, such a black color is developed by allowing the dichroic dye DP to favorably absorb scattered light in the opaque state, and allowing the light control sheet 10 to favorably suppress parallel light such that the value of PTb/PTa will be greater than 80.

The lower limit of the chromaticity a* may, for example, be preferably −10, −5, or −1. The upper limit of the chromaticity a* may, for example, be preferably 10, 5, 1, 0.9, 0.5, 0.4, 0.2, or 0.1.

The lower limit of the chromaticity b* may, for example, be preferably −10, −7, −6, −5, −4.5, −2, or −1. The upper limit of the chromaticity b* may, for example, be preferably 10, 5, 3, or 1

For the above Condition 2, the total light transmittance of the light control sheet 10 in the opaque state can be changed by changing the content of the dichroic dye DP in the light control layer 11. If the content of the dichroic dye DP in the light control layer 11 is increased, the total light transmittance in the opaque state decreases. Contrarily, if the content of the dichroic dye DP in the light control layer 11 is decreased, the total light transmittance in the opaque state increases. Accordingly, when adjusting the total light transmittance in the opaque state so as to satisfy Condition 2, the content of the dichroic dye DP may be increased within the range where the value of PTb/PTa does not deviate from Condition 1.

For the above Condition 2, the total light transmittance of the light control sheet 10 in the opaque state can be changed by changing the thickness of the light control layer 11. The total light transmittance of the light control sheet 10 in the opaque state decreases as the thickness of the light control layer 11 increases, and increases as the thickness of the light control layer 11 decreases. Accordingly, when adjusting the total light transmittance in the opaque state so as to satisfy Condition 2, the thickness of the light control layer 11 may be increased within the range where the value of PTb/PTa does not deviate from Condition 1.

For the above Condition 2, the total light transmittance of the light control sheet 10 in the opaque state can be changed by changing the total light transmittance of the colored layer 14. The lower the total light transmittance of the colored layer 14, the lower the total light transmittance of the light control sheet 10 in the opaque state, and the higher the total transmittance of the colored layer 14, the higher the total light transmittance of the light control sheet 10 in the opaque state. The colored layer 14 not only reduces the total light transmittance of the light control sheet 10 in the opaque state, but also reduces both the parallel light transmittance PTa of the light control sheet 10 in the opaque state and the parallel light transmittance PTb thereof in the transparent state. Therefore, being provided with the colored layer 14, the total light transmittance of the light control sheet 10 in the opaque state can be reduced without greatly changing the value of PTb/PTa.

For the above Condition 3, the chromaticity a* and chromaticity b* of the light control sheet 10 in the opaque state can be controlled by appropriately selecting the absorption spectrum of the dichroic dye DP. The absorption spectrum of the dichroic dye DP can be controlled by changing the combination of cyan, magenta, and yellow, i.e., the three primary colors.

For the above Condition 3, the chromaticity a* and chromaticity b* of the light control sheet 10 in the opaque state can also be controlled by appropriately selecting the color of the colored layer 14. The color of the colored layer 14 may be selected such that the composite color, in which the color exhibited by the light control layer 11 is overlapped with the color exhibited by the colored layer 14, satisfies the above Condition 3 in the opaque state.

Method of Producing Light Control Sheet

A method for producing the light control sheet 10 will be described. A first transparent support layer 13A provided with a first transparent electrode layer 12A, and a second transparent support layer 13B provided with a second transparent electrode layer 12B are prepared first. Next, a coating film for forming the light control layer 11 is formed between the first and second transparent electrode layers 12A and 12B.

The coating film contains a photopolymerizable compound, liquid crystal composition 32, dichroic dye DP, and polymerization initiator for initiating polymerization of the photopolymerizable compound. The polymerization initiator is at least one selected from diketone compounds, acetophenone compounds, benzoin compounds, benzophenone compounds, and thioxanthone compounds. The polymerization initiator may be a single compound or a combination of two or more compounds. Examples of the polymerization initiator include at least one of benzoin methyl ether, benzoin ethyl ether, benzoin isopropyl ether, and cyclohexyl phenyl ketone.

The method of producing the light control sheet 10 includes phase-separating liquid crystal particles composed of the liquid crystal composition 32 from the photopolymerizable compound by polymerizing the photopolymerizable compound in the coating film. The light for polymerizing the photopolymerizable compound may be UV light or electron beams. The light for polymerizing the photopolymerizable compound may be applied to the first transparent support layer 13A, or to the second transparent support layer 13B, or may be applied to both the first and second transparent support layers 13A and 13B.

Phase-separation of the liquid crystal particles composed of the liquid crystal composition 32 progresses through polymerization of the photopolymerizable compound and dispersion of the liquid crystal composition 32. The rate of polymerization of the photopolymerizable compound depends on the intensity of light applied to the photopolymerizable compound. The rate of dispersion of the liquid crystal composition 32 depends the processing temperature during polymerization of the photopolymerizable compound. In phase-separation of the liquid crystal composition 32, the intensity of light applied to the photopolymerizable compound, the application time, and the processing temperature during polymerization of the photopolymerizable compound are determined such that the liquid crystal particles will have a desired size, or the quantity of the liquid crystal particles will be a desired quantity. Specifically, in phase-separation of the liquid crystal composition 32, the intensity of light applied to the photopolymerizable compound, the application time, and the processing temperature during polymerization of the photopolymerizable compound are determined such that Condition 1 is satisfied with the size of the voids 31D or the quantity of the voids 31D. Thus, a laminate formed of the light control layer 11, first transparent electrode layer 12A, second transparent electrode layer 12B, first transparent support layer 13A, and second transparent support layer 13B is constituted.

Next, a colored layer 14 is bonded to the surface of the first transparent support layer 13A facing away from the surface contacting the first transparent electrode layer 12A. The colored layer 14 may be adhered to the first transparent support layer 13A using an adhesive or may be bonded using other method such as welding.

According to the above embodiment, the effects listed below can be achieved.

(1) Difference in shade of apparent hue between the transparent and opaque states can be increased by allowing the parallel light transmittance PTa of the light control sheet 10 in the opaque state and the parallel light transmittance PTb thereof in the transparent state to satisfy a relationship PTb/PTa>80. Accordingly, the contrast between the transparent and opaque states can be clearly seen.

(2) Visible light can be sufficiently blocked in the opaque state, or further, sufficient darkness can be achieved in the hue of the light control sheet 10 by allowing the total light transmittance of the light control sheet 10 in the opaque state to be 30% or less.

(3) The color of the light control sheet 10 in the opaque state can be black or a color close to black by allowing the chromaticity a* to be −15 or more and 15 or less and the chromaticity b* to be −15 or more and 15 or less in the light control sheet 10 in the opaque state. Specifically, such a black color is developed by allowing the dichroic dye DP to favorably absorb scattered light in the opaque state, and allowing the light control layer 11 to favorably suppress the parallel light transmittance such that the value of PTb/PTa will be greater than 80.

(4) The hue of the spacers 33 can be prevented from becoming noticeable in the appearance of the light control sheet 10 by allowing the spacers 33 to exhibit the same color as the color exhibited in the opaque state by the dichroic dye DP. Since the spacers 33 are colored, the scattered light caused in the opaque state by the liquid crystal compound LCM can be absorbed by the spacers 33. Thus, compared to the case where the spacers 33 are white, or colorless and transparent, the parallel light transmittance PTa in the opaque state can be decreased. Accordingly, the proportion of the parallel light transmittance PTb in the transparent state relative to the parallel light transmittance PTa in the opaque state can be increased. In particular, if the dichroic dye DP and the spacers 33 are constituted to exhibit a black color as in the above embodiment, the scattered light in the opaque state can be favorably absorbed.

(5) The light control sheet 10 in the opaque state exhibits a composite color in which the color exhibited by the light control layer 11 is overlapped with the color exhibited by the colored layer 14. Therefore, by allowing the colored layer 14 to exhibit the same color as the color exhibited in the opaque state by the dichroic dye DP, the color of the light control sheet 10 in the opaque state can be made clearer, compared to the case of achieving the color of the light control sheet 10 in the opaque state only by the color exhibited by the light control layer 11. Furthermore, by allowing the light control sheet 10 to include the colored layer 14, the total light transmittance of the light control sheet 10 in the opaque state can be reduced by the amount of visible light that is blocked by the colored layer 14.

EXAMPLES

Referring to FIGS. 3 and 4, examples and comparative examples of the light control sheet 10 will be described. The following examples are only examples for describing the effects of the above embodiment and do not necessarily limit the present invention.

Example 1

The light control sheet 10 of Example 1 does not include a colored layer 14, but includes a light control layer 11, a first transparent electrode layer 12A, a second transparent electrode layer 12B, a first transparent support layer 13A, and a second transparent support layer 13B. The light control layer 11 of Example 1 includes an organic polymer layer 31, a liquid crystal composition 32, and black transparent spacers 33. The liquid crystal composition 32 of Example 1 contains a liquid crystal compound LCM, and a dichroic dye DP exhibiting a black color when the light control sheet 10 is in the opaque state.

Materials used for the light control sheet 10 of Example 1 are as shown below.

First transparent electrode layer 12A: Indium tin oxide, thickness: 30 nm

Second transparent electrode layer 12B: Indium tin oxide, thickness: 30 nm

First transparent support layer 13A: Polyethylene terephthalate film, thickness: 125 μm Second transparent support layer 13B: Polyethylene terephthalate film, thickness: 125 μm Spacers 33: Perfectly spherical particles made of PMMA, particle size: 16 μm, black UV curable compound: Isobornyl acrylate, pentaerythritol triacrylate, urethane acrylate, 40 mass %

Polymerization initiator: 1-hydroxycyclohexyl phenyl ketone, 3 mass %

Liquid crystal compound LCM: Cyanobiphenyl compound, 54 mass %

Dichroic dye DP: Black dichroic dye (Product name YH-428 manufactured by Mitsui Fine Chemicals, Inc.), 3.0 mass %

A coating film with a thickness of 16 μm was formed on the first transparent electrode layer 12A by applying the coating liquid of Example 1, and the spacers 33 were dispersed in the coating film. Then, the second transparent electrode layer 12B was overlapped on the coating film in which the spacers 33 had been dispersed to sandwich the coating film between the first and second transparent electrode layers 12A and 12B. Then, UV light with a wavelength of 365 nm was applied to the first transparent support layer 13A to obtain a light control sheet 10 of Example 1. In this case, the intensity of the UV light was set to 10 mW/cm$^2$ and duration of the UV light irradiation was set to 100 sec.

Example 2

The light control sheet 10 of Example 2 was prepared similarly to that of Example 1 except that the spacers 33 contained in the light control layer 11 were white and transparent.

The materials of the light control sheet 10 of Example 2 were different from those of Example 1 in the following point.

Spacers 33: Perfectly spherical particles made of PMMA, particle size: 16 μm, white A coating film in which the spacers 33 had been dispersed was sandwiched between the first and second transparent electrode layers 12A and 12B, followed by applying UV light with a wavelength of 365 nm to the first transparent support layer 13A to obtain a light control sheet 10 or Example 2. In this case, the intensity of the UV light was set to 10 mW/cm$^2$ and duration of the UV light irradiation was set to 100 sec.

Example 3

In the light control sheet 10 of Example 3, a colored layer 14 exhibiting a black color was attached to the light control sheet 10 of Example 1. The total light transmittance of the colored layer 14 was 46%.

The materials of the light control sheet 10 of Example 3 were different from those of Example 1 in the following point.

Colored layer 14: Black colored layer (Product name: Lumicool (trademark), Total light transmittance: 46%, manufactured by IKC Co., Ltd.)

Example 4

In the light control sheet 10 of Example 4, a colored layer 14 exhibiting a black color was attached to the light control sheet 10 of Example 2. The total light transmittance of the colored layer 14 was 46%. The colored layer 14 included in the light control sheet 10 of Example 4 was similar to the colored layer 14 included in the light control sheet 10 of Example 3.

Example 5

In the light control sheet 10 of Example 5, a colored layer 14 exhibiting a black color was attached to the light control sheet 10 of Example 1. The total light transmittance of the colored layer 14 was 7%.

The materials of the light control sheet 10 of Example 5 were different from those of Example 1 in the following point.

Colored layer 14: Black colored layer (Product name: Lumicool (trademark), Total light transmittance: 7%, manufactured by IKC Co., Ltd.)

Example 6

In the light control sheet 10 of Example 6, a colored layer 14 exhibiting a black color was attached to the light control sheet 10 of Example 2. The total light transmittance of the colored layer 14 was 7%. The colored layer 14 included in the light control sheet 10 of Example 6 was similar to the colored layer 14 included in the light control sheet 10 of Example 5.

Example 7

The light control sheet 10 of Example 7 was prepared similarly to the light control sheet 10 of Example 2 except that a dichroic dye DP exhibiting a blue color when the light control sheet 10 was opaque was used in place of the black dichroic dye DP.

The materials of the light control sheet 10 of Example 7 were different from those of Example 2 in the following point.

Dichroic dye DP: Blue dichroic dye (Product name: M-412 manufactured by Mitsui Fine Chemicals, Inc.), 3.0 mass %

A coating film of Example 7 was sandwiched between the first and second transparent electrode layers 12A and 12B, followed by applying UV light with a wavelength of 365 nm to the first transparent support layer 13A to obtain a light control sheet 10 of Example 7. In this case, the intensity of the UV light was set to 10 mW/cm$^2$ and duration of the UV light irradiation was set to 100 sec.

Comparative Example 1

The light control sheet 10 of Comparative Example 1 was prepared similarly to that of Example 1 except that the light control layer 11 did not include the dichroic dye DP.

Comparative Example 2

The light control sheet 10 of Comparative Example 2 was prepared similarly to that of Example 2 except that the light control layer 11 did not include the dichroic dye DP.

Comparative Example 3

The light control sheet 10 of Comparative Example 3 was prepared similarly to that of Example 4 except that the light control layer 11 did not include the dichroic dye DP.

Comparative Example 4

The light control sheet 10 of Comparative Example 4 was prepared similarly to that of Example 6 except that the light control layer 11 did not include the dichroic dye DP.

Evaluation

The light control sheets 10 of Examples 1 to 7 and Comparative Examples 1 to 4 were evaluated on the following evaluation items (A) to (D). FIG. 3 shows the evaluation results on the evaluation items (A) to (D).
   (A) Evaluation of the proportion of the parallel light transmittance PTb in the transparent state of the light control sheet 10 relative to the parallel light transmittance PTa in the opaque state of the light control sheet 10
   (B) Evaluation of the total light transmittance of the light control sheet 10 in the opaque state
   (C) Evaluation of the chromaticities of the light control sheet 10 in the opaque state
   (D) Evaluation of the appearance of the light control sheet 10 in the opaque state
   In the evaluation (A), the parallel light transmittance PTa was measured for the light control sheet 10 that was in the opaque state without application of the drive voltage. Then, the parallel light transmittance PTb was measured for the light control sheet 10 that was in the transparent state with application of the drive voltage. In the evaluation (A), a haze meter (Product name: NDH2000 manufactured by Nippon Denshoku Industries Co., Ltd.) was used. Using the method according to JIS K 7136, the parallel light transmittances PTa and PTb were measured, taking the component detected by the light trap at the exit aperture to be the diffuse component, and taking the component obtained by removing the diffuse component from the total transmitted light to be the parallel component.
   In the light control sheets 10 of Examples 1 to 7, the proportion of the parallel light transmittance PTb in the transparent state relative to the parallel light transmittance PTa in the opaque state, i.e., the value of PTb/PTa, exceeded 80. In particular, in Examples 1, 3 and 5 each including the light control layer 11 containing black transparent spacers 33, the value of PTb/PTa exceeded 200. In Examples 2, 4, 6 and 7 each including the light control layer 11 containing white transparent spacers 33, the value of PTb/PTa was around 100. Accordingly, in Examples 1 to 7, the above Condition 1 was satisfied. However, in Comparative Examples 1 to 4, the value of PTb/PTa was 80 or lower.
   In the evaluation (B), the total light transmittance was measured using the method according to JIS K 7361-1:1997 (ISO 1468-1), for the light control sheet 10 that was in the opaque state without application of the drive voltage. For the evaluation (B), a total light transmittance measuring device (Product name: NDH2000) was used.

In the light control sheets 10 of Examples 1 to 6, the total transmittance in the opaque state was 30% or less. Accordingly, in Examples 1 to 6, the above Condition 2 was satisfied. In Examples 1 to 6, as in Examples 5 and 6, the total light transmittance of the light control sheet 10 in the opaque state tended to be lower in the light control sheets under conditions where a colored layer 14 with lower total light transmittance is provided. However, in the light control sheet 10 of Example 7, the total light transmittance in the opaque state exceeded 30%. This is thought to be because the type of the dichroic dye DP of the light control sheet 10 of Example 7 was different from those of Examples 1 to 6.
   In the light control sheets 10 of Comparative Examples 1 to 3, the total transmittance in the opaque state exceeded 30%. In the light control sheet 10 of Comparative Example 4, the total transmittance in the opaque state was 30% or less. This is thought to be because the colored layer 14 included in the light control sheet 10 of Comparative Example 4 had low total light transmittance (7%).
   In the evaluation (C), the chromaticities a* and b* were measured using a colorimeter, for the light control sheet 10 that was in the opaque state without application of the drive voltage. The chromaticities a* and b* are specified in the CIE 1976 (L*a*b*) color system according to JIS-Z-8781-4.
   In the light control sheets 10 of Examples 1 to 6 and Comparative Examples 1 to 4, the chromaticity a* was-15 or more and 15 or less, and the chromaticity b* was-15 or more and 15 or less. Accordingly, in Examples 1 to 6 and Comparative Examples 1 to 4, the above Condition 3 was satisfied. However, in the light control sheet 10 of Example 7, the chromaticity b* exceeded 15, although the chromaticity a* was-15 or more and 15 or less. This is thought to be because the type of the dichroic dye DP of the light control sheet 10 of Example 7 was different from those of Examples 1 to 6.
   In the evaluation (D), whether a clear black color could be obtained was determined with the naked eye, for the light control sheet 10 that was in the opaque state without application of the drive voltage. As for the evaluation criteria, those with a clear black appearance were evaluated to be Excellent. Those with a whitish appearance in the black color, due to the scattered light caused by the liquid crystal compound LCM, were evaluated to be Good. Those with a hue other than white in the black color were evaluated to be Fair. Those confirmed to have relatively strong whiteness in the black color, due to the scattered light caused by the liquid crystal compound LCM, and those not confirmed to have a black color were evaluated to be Poor.
   In Examples 1, 3 and 5 each including the light control layer 11 containing the black transparent spacers 33, a clear black appearance was observed. In Examples 2, 4 and 6, a whitish appearance due to the scattered light caused by the liquid crystal compound LCM was observed in the black color. In Example 7, a yellowish appearance was observed in the black color. The yellowish appearance was estimated to be caused by the effect of scattered light due to Rayleigh scattering becoming relatively strong, because the light control sheet 10 of Example 7 had higher total light transmittance in the opaque state compared to Examples 1 to 6. In Comparative Examples 1 to 4, relatively strong whiteness due to the scattered light caused by the liquid crystal compound LCM was observed in the black color.

Modifications

The embodiment described above can be modified and implemented as follows.

The light control sheet 10 may include two colored layers 14 sandwiching the laminate constituted of the light control layer 11, first transparent electrode layer 12A, second transparent electrode layer 12B, first transparent support layer 13A, and second transparent support layer 13B. In this case, one colored layer 14 is formed on the surface of the first transparent support layer 13A facing away from the surface contacting the first transparent electrode layer 12A, and the other colored layer 14 is formed on the surface of the second transparent support layer 13B facing away from the surface contacting the second transparent electrode layer 12B. With this configuration, the total light transmittance of the light control sheet 10 in the opaque state can be further reduced, and the values of the chromaticities a* and b* can be approximated to values closer to black.

If the light control sheet 10 satisfies at least Condition 1, the colored layer 14 may be omitted. In this case, the thickness of the light control sheet 10 can be reduced. However, even in this case, the light control sheet 10 is preferred to be constituted to satisfy Conditions 2 and 3. For example, the layers constituting the light control sheet 10 may be changed by combining the first transparent electrode layer 12A, second transparent electrode layer 12B, first transparent support layer 13A, and second transparent support layer 13B, so that optical characteristics equivalent to the case of including the colored layer 14 can be achieved.

If the light control sheet 10 satisfies at least Condition 1, the color exhibited by the colored layer 14 may be different from the color exhibited in the opaque state by the dichroic dye DP. In this case also, the total light transmittance of the light control sheet 10 in the opaque state can be reduced by the colored layer 14.

If the light control sheet 10 satisfies at least Condition 1, the color exhibited by the spacers 33 may be different from the color exhibited in the opaque state by the dichroic dye DP. In this case also, for example, if the spacers 33 are colored, the scattered light caused in the opaque state can be absorbed by the spacers 33. Thus, the parallel light transmittance PTa in the opaque state can be lowered, resultantly increasing the proportion of the parallel light transmittance PTb in the transparent state relative to PTa. Furthermore, part or all of the spacers 33 added to the light control layer 11 may be colorless and transparent, with the particle size adjusted, so that the appearance of the spacers 33 can be made less noticeable.

If the light control sheet 10 satisfies at least Condition 1, both or either of the chromaticities a* and b* may be outside the range of Condition 3. Specifically, in the opaque state, the light control sheet 10 may be constituted to exhibit a black color or a color other than the color close to black. In this case also, the effects conforming to the above items (1) and (2) can be achieved.

If the light control sheet 10 satisfies at least Condition 1, the total light transmittance of the light control sheet 10 in the opaque state may exceed 30%. In this case also, since the proportion of PTb relative to PTa is great, the contrast between the transparent and opaque states can be clearly seen.

If the light control sheet 10 is formed to switch between the transparent and opaque states based on the change in the alignment state of the liquid crystal compound LCM, the light control sheet 10 may include at least one other functional layer. This other functional layer may be a gas barrier layer preventing permeation of oxygen or moisture toward the light control layer 11, or may be a UV barrier layer preventing transmission of UV light with wavelengths other than a specific wavelength toward the light control layer 11.

This other functional layer may be a hard coat layer physically protecting the layers of the light control sheet 10, or may be an adhesive layer enhancing adhesion between the layers of the light control sheet 10.

The light control sheet 10 provided with the light control layer 11 containing the organic polymer layer 31 and the liquid crystal composition 32 has been exemplified; however, instead of this, the light control sheet 10 may be provided in the form of a suspended particle device (SPD) system containing light control particles as alignment particles. The SPD system is a system in which a light control suspension containing light control particles is dispersed in a resin matrix.

Light control sheets include a light control layer containing a liquid crystal composition, and two transparent electrode sheets sandwiching the light control layer. The alignment state of the liquid crystal composition in the light control layer changes in response to the drive voltage applied between the two transparent electrode sheets. This changes the transparency of the light control sheet. When an alignment order is established in the long-axis direction of the liquid crystal composition, the light control sheet exhibits high transparency. When the alignment in the long-axis direction of the liquid crystal composition is disordered, the light control sheet exhibits low transparency.

Light control sheets may be colorless and transparent in the transparent state exhibiting high transparency. When light control sheets are in an opaque state exhibiting low transparency, visible light is scattered inside the light control sheets. Therefore, when viewed with the naked eye, such light control sheets appear to be turbid. Depending on the use environments, light control sheets with colors other than the turbid color may be preferred, from the perspective of aesthetic properties. For this reason, in light control sheets, it has been proposed to add a dichroic dye to the liquid crystal composition (e.g., see JP 2020-016710 A). Dichroic dyes have anisotropy in absorbance. Dichroic dyes exhibit high absorbance when the alignment of the long axes is disordered. Light control sheets containing dichroic dyes develop colors derived from the dichroic dyes in the opaque state, instead of the color due to the turbidity.

The light control sheets mentioned above create a new field of application by increasing contrast, that is, difference in shade of apparent hue, between the transparent and opaque states, by which industries associated with light control sheets can be developed. Therefore, there is a need for light control sheets in which the contrast between the transparent and opaque states is clearly visible with the naked eye.

In one aspect of the present invention, a light control sheet is provided. The light control sheet includes a light control layer containing an organic polymer layer containing a plurality of voids, and a liquid crystal composition filling the plurality of voids; two transparent electrode layers; and two transparent support layers, wherein the liquid crystal composition contains a liquid crystal compound and a dichroic dye; the light control layer is sandwiched between the two transparent electrode layers; the light control layer and the two transparent electrode layers are sandwiched between the two transparent support layers; the light control sheet switches a state thereof from a transparent state to an opaque state exhibiting a first color, the switching being due to change in alignment of the liquid crystal compound and the dichroic dye in response to change in potential difference between the two transparent electrode layers; and a parallel light transmittance PTa in the opaque state and a parallel light transmittance PTb in the transparent state satisfy a relationship PTb/PTa>80.

Obviously, numerous modifications and variations of the present invention are possible in light of the above teachings. It is therefore to be understood that within the scope of the appended claims, the invention may be practiced otherwise than as specifically described herein.

The invention claimed is:

1. A light control sheet, comprising
a light control layer comprising an organic polymer layer having voids and a liquid crystal composition filling the voids;
a plurality of transparent electrode layers formed such that the light control layer is sandwiched between the transparent electrode layers; and
a plurality of transparent support layers formed such that the light control layer and the transparent electrode layers are sandwiched between the transparent support layers,
wherein the light control layer is formed such that the liquid crystal composition includes a liquid crystal compound and a dichroic dye, the transparent electrode layers are configured to change potential difference between the transparent electrode layers such that the light control layer switches from a transparent state to an opaque state exhibiting a first color due to change in alignment of the liquid crystal compound and the dichroic dye, and the light control layer includes the liquid crystal compound and the dichroic dye such that a parallel light transmittance PTa in the opaque state and a parallel light transmittance PTb in the transparent state satisfy a relationship PTb/PTa>80.

2. The light control sheet according to claim 1, wherein the parallel light transmittance PTa in the opaque state is 0.6 or less.

3. The light control sheet according to claim 2, wherein a total light transmittance in the opaque state is 30% or less.

4. The light control sheet according to claim 3, wherein each of a chromaticity a* and a chromaticity b* in a CIE 1976 (L*a*b*) color system according to JIS-Z-8781-4 is in a range of −15 to 15 in the opaque state.

5. The light control sheet according to claim 4, wherein the light control layer includes spacers that exhibit the first color.

6. The light control sheet according to claim 3, wherein the light control layer includes spacers that exhibit the first color.

7. The light control sheet according to claim 3, further comprising:
a colored layer that exhibits the first color,
wherein each of the transparent support layers has a first surface and a second surface facing away from the first surface such that the first surface is contacting a respective one of the transparent electrode layers and that the colored layer is formed on the second surface of at least one of the transparent support layers.

8. The light control sheet according to claim 2, wherein each of a chromaticity a* and a chromaticity b* in a CIE 1976 (L*a*b*) color system according to JIS-Z-8781-4 is in a range of −15 to 15 in the opaque state.

9. The light control sheet according to claim 2, wherein the light control layer includes spacers that exhibit the first color.

10. The light control sheet according to claim 2, further comprising:
a colored layer that exhibits the first color,
wherein each of the transparent support layers has a first surface and a second surface facing away from the first surface such that the first surface is contacting a respective one of the transparent electrode layers and that the colored layer is formed on the second surface of at least one of the transparent support layers.

11. The light control sheet according to claim 1, wherein a total light transmittance in the opaque state is 30% or less.

12. The light control sheet according to claim 11, wherein each of a chromaticity a* and a chromaticity b* in a CIE 1976 (L*a*b*) color system according to JIS-Z-8781-4 is in a range of −15 to 15 in the opaque state.

13. The light control sheet according to claim 11, wherein the light control layer includes spacers that exhibit the first color.

14. The light control sheet according to claim 11, further comprising:
a colored layer that exhibits the first color,
wherein each of the transparent support layers has a first surface and a second surface facing away from the first surface such that the first surface is contacting a respective one of the transparent electrode layers and that the colored layer is formed on the second surface of at least one of the transparent support layers.

15. The light control sheet according to claim 1, wherein each of a chromaticity a* and a chromaticity b* in a CIE 1976 (L*a*b*) color system according to JIS-Z-8781-4 is in a range of −15 to 15 in the opaque state.

16. The light control sheet according to claim 15, wherein the light control layer includes spacers that exhibit the first color.

17. The light control sheet according to claim 15, further comprising:
a colored layer that exhibits the first color,
wherein each of the transparent support layers has a first surface and a second surface facing away from the first surface such that the first surface is contacting a respective one of the transparent electrode layers and that the colored layer is formed on the second surface of at least one of the transparent support layers.

18. The light control sheet according to claim 1, wherein the light control layer includes spacers that exhibit the first color.

19. The light control sheet according to claim 18, further comprising:
a colored layer that exhibits the first color,
wherein each of the transparent support layers has a first surface and a second surface facing away from the first surface such that the first surface is contacting a respective one of the transparent electrode layers and that the colored layer is formed on the second surface of at least one of the transparent support layers.

20. The light control sheet according to claim 1, further comprising:
a colored layer that exhibits the first color,
wherein each of the transparent support layers has a first surface and a second surface facing away from the first surface such that the first surface is contacting a respective one of the transparent electrode layers and that the colored layer is formed on the second surface of at least one of the transparent support layers.

* * * * *